(12) United States Patent
Smirnov (10) Patent No.: US 10,915,779 B2
(45) Date of Patent: Feb. 9, 2021

(54) METHOD FOR EXTRACTING UNIFORM FEATURES FROM POINT CLOUD AND SYSTEM THEREFOR

(71) Applicant: Unikie Oy, Tampere (FI)

(72) Inventor: Sergey Smirnov, Tampere (FI)

(73) Assignee: Unikie Oy, Tampere (FI)

( * ) Notice: Subject to any disclaimer, the term of this patent is extended or adjusted under 35 U.S.C. 154(b) by 39 days.

(21) Appl. No.: 16/395,316

(22) Filed: Apr. 26, 2019

(65) Prior Publication Data

US 2020/0342250 A1  Oct. 29, 2020

(51) Int. Cl.
| | | |
|---|---|---|
| *G06K 9/46* | (2006.01) | |
| *G06K 9/62* | (2006.01) | |
| *G06T 7/73* | (2017.01) | |
| *G06T 7/10* | (2017.01) | |
| *G06K 9/42* | (2006.01) | |
| *G06T 7/60* | (2017.01) | |

(52) U.S. Cl.
CPC ............... *G06K 9/46* (2013.01); *G06K 9/42* (2013.01); *G06K 9/6232* (2013.01); *G06T 7/10* (2017.01); *G06T 7/73* (2017.01); *G06T 7/60* (2013.01); *G06T 2207/10028* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,934,590 B1* | 4/2018 | Cheng | G06K 9/4642 |
| 2015/0317822 A1* | 11/2015 | Haimovitch-Yogev | |
| | | | G06T 15/205 |
| | | | 345/419 |
| 2018/0122137 A1* | 5/2018 | Tian | G06T 7/521 |
| 2019/0236809 A1* | 8/2019 | Graziosi | G06T 7/10 |
| 2020/0058137 A1* | 2/2020 | Pujades | G06T 7/75 |
| 2020/0143237 A1* | 5/2020 | Gordon | G06N 3/08 |
| 2020/0191971 A1* | 6/2020 | Hua | G01S 17/89 |

* cited by examiner

*Primary Examiner* — Mohammed Rachedine
(74) *Attorney, Agent, or Firm* — Ziegler IP Law Group, LLC (57) ABSTRACT

A method for extracting uniform features of at least one object, from a point cloud of an environment, includes acquiring the point cloud associated with the environment having the at least one object, wherein the point cloud is associated with a volume comprising a plurality of points; segmenting the point cloud into at least one sub-volume corresponding to each of the at least one object; applying a non-uniform transform on each of the plurality of points corresponding to each of the at least one sub-volume, to obtain a transform coefficient for each of the plurality of points; and selecting a subset of the plurality of transform coefficients as the extracted uniform features of the at least one object within the environment.

19 Claims, 2 Drawing Sheets

METHOD FOR EXTRACTING UNIFORM FEATURES FROM POINT CLOUD AND SYSTEM THEREFOR

TECHNICAL FIELD

The aspects of the disclosed embodiments relate generally to three-dimensional modelling of objects in an environment; and more specifically, to methods for extracting uniform features of objects from point cloud of an environment. Moreover, the aspects of the disclosed embodiments also relate to systems for extracting uniform features of objects from point cloud of environment.

BACKGROUND

Generally, computer-based systems are finding increased application in various day-to-day activities of people. For example, computer-based systems employing image processing technologies are being used, such as, for detection of humans for applications related to defence, sports, medicine and so forth; detection of plants and animals for scientific studies related to plant growth, determination of species population; detection of objects for applications related to autonomous driving, determination of theft, medical procedures (such as surgery); and the like. Notably, such computer-based systems employing the image processing technologies implements machine vision techniques for performing such detection of humans, animals, objects and so forth. In an example, machine vision techniques collect point cloud for image processing and subsequently, perform feature extraction from the point cloud for detection of objects.

Conventionally, point-cloud acquisition devices such as Lidar, 3D Laser Scanner, RADAR, multi-camera systems and so forth are used to collect the point cloud for detection of objects. Generally, feature extraction from the point cloud is carried out by employing machine learning algorithms. Notably, an input to the machine learning algorithms requires a rigidly defined structure, whereas the point cloud comprises data points having random spatial locations, mean values and so forth. Therefore, techniques have been developed to convert the random data points into rigidly defined data points in order to extract the features from the point cloud.

However, there are several drawbacks associated with the techniques employed for feature extraction from the point cloud. Generally, collection of the data points for an object comprises acquiring the data points from different positions, therefore, a location of the acquired data points and the number of acquired data points in the point cloud differs for each position of the acquisition device. As a result, the feature extraction of such an object becomes unreliable. It will be appreciated that the point cloud comprises a large number of data points, therefore, processing such large number of data points require vast amounts of memory. Moreover, processing such large number of data points reduces a processing speed required to extract features of the object. Subsequently, a time required to process the point cloud to extract features of the object is substantially increased.

Therefore, in light of the foregoing discussion, there exists a need to overcome the aforementioned drawbacks associated with feature extraction from the point cloud for detection of objects.

SUMMARY

The aspects of the disclosed embodiments seek to provide a method for extracting uniform features of at least one object, from a point cloud of an environment. The aspects of the disclosed embodiments also seek to provide a system for extracting uniform features of at least one object, from a point cloud of an environment. The aspects of the disclosed embodiments seek to provide a solution to the existing problem of large amount of memory required for processing the point cloud and slow processing speed of the system. An aim of the aspects of the disclosed embodiments is to provide a solution that overcomes at least partially the problems encountered in prior art, and provides the method and system for extracting the uniform features of the at least object from a point cloud of an environment without utilisation of large amount of memory and processing with enhanced speed.

In one aspect, an embodiment of the present disclosure provides a method for extracting uniform features of an at least one object from a point cloud of an environment, the method comprising:
(i) acquiring the point cloud associated with the environment having the at least one object, wherein the point cloud is associated with a volume comprising a plurality of points;
(ii) segmenting the point cloud into at least one sub-volume corresponding to each of the at least one object;
(iii) applying a non-uniform transform on each of the plurality of points corresponding to each of the at least one sub-volume, to obtain a transform coefficient for each of the plurality of points; and
(iv) selecting a subset of the plurality of transform coefficients for extracting the uniform features of the at least one object within the environment.

In another aspect, an embodiment of the present disclosure provides a system for extracting uniform features of an at least one object from a point cloud of an environment, the system comprising:
   a point-cloud acquisition device to acquire the point cloud associated with the environment having the at least one object, wherein the point cloud is associated with a volume comprising a plurality of points;
   a data processing module communicatively coupled to the point-cloud acquisition device, wherein the data processing module is configured to:
   receive the point cloud from the point-cloud acquisition device,
   segment the point cloud into at least one sub-volume corresponding to each of the at least one object,
   apply a non-uniform transform on each of the plurality of points corresponding to each of the at least one sub-volume, to obtain a transform coefficient for each of the plurality of points, and
   select a subset of the plurality of transform coefficients for extracting the uniform features of the at least one object within the environment; and
   a memory module communicatively coupled to the data processing module, wherein the memory module is configured to store the point cloud of the environment and the uniform features of the at least one object.

Embodiments of the present disclosure substantially eliminate or at least partially address the aforementioned problems in the prior art, and enable fast processing speed and less memory utilisation by the system for three-dimensional modelling of the object in the environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In one aspect, an embodiment of the present disclosure provides a method for extracting uniform features of an at least one object from a point cloud of an environment, the method comprising:
(i) acquiring the point cloud associated with the environment having the at least one object, wherein the point cloud is associated with a volume comprising a plurality of points;
(ii) segmenting the point cloud into at least one sub-volume corresponding to each of the at least one object;
(iii) applying a non-uniform transform on each of the plurality of points corresponding to each of the at least one sub-volume, to obtain a transform coefficient for each of the plurality of points; and
(iv) selecting a subset of the plurality of transform coefficients for extracting the uniform features of the at least one object within the environment.

In another aspect, an embodiment of the present disclosure provides a system for extracting uniform features of an at least one object from a point cloud of an environment, the system comprising:
a point-cloud acquisition device to acquire the point cloud associated with the environment having the at least one object, wherein the point cloud is associated with a volume comprising a plurality of points;
a data processing module communicatively coupled to the point-cloud acquisition device, wherein the data processing module is configured to
receive the point cloud from the point-cloud acquisition device,
segment the point cloud into at least one sub-volume corresponding to each of the at least one object,
apply a non-uniform transform on each of the plurality of points corresponding to each of the at least one sub-volume, to obtain a transform coefficient for each of the plurality of points, and
select a subset of the plurality of transform coefficients for extracting the uniform features of the at least one object within the environment; and
a memory module communicatively coupled to the data processing module, wherein the memory module is configured to store the point cloud of the environment and the uniform features of the at least one object.

The present disclosure provides the aforementioned method and the aforementioned system for extracting uniform features of the at least one object from the point cloud of the environment. The method enables segmenting the point cloud in a cluster having the sub-volume associated with the at least one object. Moreover, the at least one object is normalised into a voxel, such that one voxel is processed at a time, therefore less amount of memory is utilised while processing the point cloud, thereby enhancing a processing speed of the system. Such enhanced processing speed allows a reduction in time required for processing the point cloud. Furthermore, the method comprises applying the non-uniform transform on the plurality of points associated with the at least one object to obtain the transform coefficients. The non-uniform transform applied on the plurality of points transforms the unstructured irregular plurality of points in the point cloud into rigidly defined regular structures that are fed to the machine learning based engines to extract uniform features of the at least one object from the point cloud of the environment.

The present disclosure provides the method for extracting uniform features of the at least one object from the point cloud of the environment. The method comprises acquiring the point cloud associated with the environment having the at least one object, wherein the point cloud is associated with the volume comprising the plurality of points. Throughout the present disclosure, the term "point cloud" refers to a collection of the plurality of points in a specified coordinate system such that the plurality of points represent a surface of the at least one object of the environment. Specifically, the point cloud is an array of coordinates of the plurality of the points in a three-dimensional coordinate system. Moreover, each of the plurality of points in the point cloud has a volume associated therewith and thereby the point cloud comprising the plurality of points is associated with the volume.

Herein, the point cloud of the environment is acquired by the point-cloud acquisition device. The point-cloud acquisition device comprises a collection of one or more programmable and/or non-programmable components, and is configured to analyse the environment comprising the at least one object to accumulate a data related to physical structure of the at least one object. The data acquisition device comprises an image sensor such as a laser rangefinder which may be configured to perform a controlled steering of laser beams to acquire the point cloud for describing a characteristic of the at least one object, such as a distance measurement from every direction of the at least one object; and thereby capturing shape of a surface of the at least one object. Moreover, the point cloud related to the at least one object in the environment is acquired from different viewing angles by the point-cloud acquisition device.

Optionally, the point-cloud acquisition device acquires the point cloud of the environment by steering of laser beams as one or more swipes. A single swipe refers to a single rotation of the point-cloud acquisition device to collect the plurality of points. Moreover, the point-cloud acquisition device may rotate 360 degrees to collect the plurality of points. The point-cloud acquisition device is configured to rotate with a speed that can be varied accordingly. The point-cloud acquisition device rotates multiple times to collect the point cloud of the at least one object of the environment.

In an example, the point-cloud acquisition device is configured to acquire the plurality of points for the at least one object from a first position. Further, the point-cloud acquisition device is configured to acquire the plurality of points for the at least one object from a second position. Optionally, the point-cloud acquisition device comprises a plurality of image sensors. In an example, the plurality of image sensors of the point-cloud acquisition device is arranged at different locations, such that the plurality of image sensors capture the plurality of points from different positions.

Optionally, the data acquisition device comprises one of a LIDAR sensor, a three-dimensional (3D) laser scanner, a RADAR, or an at least one camera. In an example, the LIDAR (Light Detection and Ranging) sensor is configured to direct light (such as light in an ultraviolet range, visible range, or near infrared range) to the environment and further receive the reflected laser pulses from the environment. Specifically, the LIDAR sensor directs light at each object of the at least one object. The directed light is reflected from the surface of each of the object and received by the LIDAR sensor. A time taken by the directed light to reflect back determines a position of the at least one object with respect to the LIDAR sensor. The determined position is utilised to form the plurality of points associated with the surface of the at least one object to obtain the point cloud. In another example, the three-dimensional (3D) laser scanner is configured to direct laser beams onto the surface of the at least one object within the environment. Further, the laser beams are reflected from the surface of the at least one object and captured by one or more camera of the 3D laser scanner. The 3D laser scanner uses a set of algorithms to obtain the point cloud. In yet another example, the RADAR is configured to send radio waves, via one or more antenna, onto the surface of the at least one object within the environment. Moreover, the radio waves upon reflection from the surface of the at least one object are received by the one or more antenna. The one or more antenna is configured to cyclically send and receive the radio waves. The received radio waves are applied on a collection of algorithms to obtain the point cloud. In another example, the at least one camera is configured to capture the environment comprising the at least one object in order to obtain the point cloud of the environment.

In an embodiment, the point-cloud acquisition device is implemented in an autonomous driving vehicle. The autonomous driving vehicle refers to a vehicle which can instruct itself to operate, for example, to drive to a desired position and/or place with minimum or no human input. The autonomous driving vehicle extracts uniform features of the at least one object of the environment and thereby use the extracted uniform features to operate itself. Optionally, the point-cloud acquisition device may be positioned on a top of the autonomous driving vehicle. Throughout the present disclosure, the term "environment" refers to a surrounding comprising the at least one object such as humans, animals, birds, roads, trees, vehicles, water bodies, buildings, terrains and so forth. In an example, the environment may be a surrounding of the autonomous driving vehicle comprising the at least one object such as roads, vehicles, pedestrians, animals, trees, barricades, boulders, traffic cones and so forth. Such environment of the autonomous driving vehicle is analysed to extract uniform features of the at least one object to enable the autonomous driving vehicle to fulfil various purposes such as prevent collisions with other vehicles on the road, stop at designated points such as bus stops, follow traffic rules, slowdown or speedup based on a speed limit and the like. The point clouds of each of the objects such as the vehicles, the trees, the barricades, the boulders and the traffic cones associated with the environment of the autonomous driving vehicle are obtained and the uniform features are extracted to enable fast processing in order to avoid a collision and drive safely.

The uniform features of the at least one object refers to characteristics related to physical structure of the at least one object such as: dimensions (such as length, breadth and height) of the at least one object, edges of the at least one object, shape of the at least one object and the like. The extraction of the uniform features of the at least one object enables the autonomous driving vehicle to classify the at least one object and thereby drive itself based on the classification of the at least one object. Optionally, the at least one object may be classified as a vehicle, a pedestrian, a tree, an animal and the like. Moreover, based on the classification of the at least one object, the autonomous vehicle may stop, decrease the driving speed, increase the driving speed, change a direction, take turns and the like.

Optionally, the point-cloud acquisition device may be implemented in a road traffic monitoring system. The extraction of the uniform features of the at least one object enables the road traffic monitoring system to classify the at least one object on a road, like whether the at least one object is a car, truck, bus, van, motorbike and the like. Moreover, based on the classification of the object the road traffic monitoring system may keep a count of the vehicles passing on the road. Optionally, the point-cloud acquisition device may be implemented on an air borne vehicle. The extraction of the uniform features of the at least one object enables the air-borne vehicle to classify the at least one object as the air-borne vehicle, birds, any obstacle such as a pole near a runway and the like. Moreover, based on the classification of the at least one object, the air-borne vehicle may stop, decrease a flying speed, increase the flying speed, change direction and the like.

The point-cloud acquisition device is communicatively coupled to the data processing module to enable the data processing module to receive the point cloud from the point-cloud acquisition device. Throughout the present disclosure, the term "data processing module", as used herein, relates to programmable and/or non-programmable components configured to execute one or more software application for storing, processing and/or sharing data and/or set of instructions. Optionally, the data processing module may comprise, for example, a component included within an electronic communications network. Additionally, the data processing module include one or more data processing facilities for storing, processing and/or sharing data and/or set of instruction. Furthermore, the data processing module includes hardware, software, firmware or a combination of these, suitable for storing and processing various information and services accessed by the one or more user using the one or more user equipment. Optionally, the data processing module include functional components, for example, a processor, a data storing unit, a network adapter and so forth.

The data processing module is communicatively coupled to the memory module. The memory module is configured to store the point cloud of the environment. Throughout the invention, the term "memory module", as used herein, refers to an organised body of digital information regardless of the manner in which the data or the organised body thereof is represented. Optionally, the memory module may be hardware, software, firmware and/or any combination thereof. For example, the organised body of related data may be in the form of a table, a map, a grid, a packet, a datagram, a file, a document, a list or in any other suitable form. The memory module includes any data storage software and systems, such as, for example, IBM DB2 and Oracle 9. Optionally, the memory module may be operable to support relational operations, regardless of whether it enforces strict adherence to the relational model, as understood by those of ordinary skill in the art. Additionally, the memory module is populated by data elements. Furthermore, the data elements comprising data records, bits of data, cells, are used interchangeably herein and are all intended to mean information stored in cells of a memory module. Optionally, the point-cloud acquisition device, the data processing module and the memory module are all implemented in the autonomous driving vehicle.

Moreover, the method comprises segmenting the point cloud into at least one sub-volume corresponding to each of the at least one object. The segmenting of the point cloud is performed by clustering the plurality of points corresponding to the at least one object into one sub-volume. The clustering of the plurality of points refers to grouping a set of points related to one of the at least one object based on proximity of one point with respect to other points. Specifically, the plurality of points in close proximity is clustered into one set of point. The points in close proximity refer to the points having similar values of three-dimensional coordinates. In an example, points having three-dimensional coordinates such as, for example, (5,4,3), (5,5,3), (4,5,3), (5,4,4) are in close proximity and thereby can be clustered into a set of points. Herein, the segmenting of the point cloud into at least one sub-volume is performed by the data processing module. In another example, a point cloud comprises a plurality of points of an environment having objects, such as a human and a car. In such example, a plurality of objects in close proximity, corresponding to the human, are clustered into one sub-volume, and a plurality of objects in close proximity, corresponding to the car, are clustered into a second sub-volume.

In an embodiment, the segmenting comprises employing one of: K-Means technique, Kernel K-Means technique, or Hierarchical Clustering technique. Notably, the K-Means technique is a method of clustering the plurality of points into a specific number of clusters. The K-Means technique comprises selecting one or more centroids of the plurality of points and further iteratively change the position of the one or more centroids based on their distance from the plurality of points. The position of the one or more centroid is selected which has minimum distance from the plurality of points. Therefore, the plurality of points having minimum distances from a centroid is clustered. Furthermore, the Kernel K-Means technique results in the generation of non-linearly separable cluster of the plurality of points. Additionally, different clusters comprise different number of points. Moreover, the Hierarchical Clustering technique comprises iteratively merging a point with a point in close proximity to form a cluster of the plurality of points.

In an embodiment, the method further comprises determining at least one property for each of the plurality of points corresponding to the point cloud, wherein the at least one property comprises: a location, a luminance, a colour, a local density or a binary presence. Each of the plurality of points have at least one property comprising: a location, a luminance, a colour, a local density or a binary presence associated therewith. The location of a point of the plurality of points refers to the three-dimensional coordinates of the point in the environment whose point cloud is acquired by the point-cloud acquisition device. In an example, a point in the point cloud has a location: (x, y, z). The luminance of the point refers to an intensity of laser beam reflected by the surface of the object such that based on the intensity of the laser beam reflected, a corresponding distance of the object from the point-cloud acquisition device may be measured. Each of the plurality of points is associated with a colour based on a type of the object such as a human, a tree, a barricade and the like. In an example, each of plurality of points associated with a human is of red colour, each of plurality of points associated with a tree is of blue colour, and each of plurality of points associated with a barricade is of green colour. The local density of the point is an indication of a number of points in close proximity of the point. In an example, a point having a large number of points in close proximity is indicated to have a high local density. In another example, a plurality of points associated with an object is in close proximity as compared to a plurality of points associated with another object. The binary presence of the point indicates the presence or absence of the point in the point cloud. In an example, a point having a binary presence: "1" indicates a presence of the point in the point cloud. In another example, a point having a binary presence: "0" indicates an absence of the point in the point cloud.

In an embodiment, the method further comprises determining at least one parameter for the point cloud using the at least one property of each of the plurality of points, wherein the at least one parameter comprises: a size, a volume, a centroid, a density, an average of the at least one property of each of the plurality of points. The location and local density of the point having two-dimensional coordinates in the point cloud enables the data processing module to determine the size of the point cloud. In an example, a location of a point, having two-dimensional coordinates, in the point cloud and a location of a plurality of points, having two-dimensional coordinates, in the proximity of the point may represent a shape of a rectangle. In such example, a size of the point cloud is determined based on the represented shape. Furthermore, the location and local density of the point having three-dimensional coordinates in the point cloud enables the data processing module to determine the volume of the point cloud. In an example, a location of a point, having three-dimensional coordinates, in the point cloud and a location of a plurality of points, having three-dimensional coordinates, in the proximity of the point represent a shape of a cylinder. In such an example, a volume of the point cloud is determined based on the represented shape. Moreover, the location of each of the plurality of the points in the point cloud enables the data processing module to determine the centroid of the point cloud. Furthermore, the location of each point of the plurality of points enables the data processing module to determine a number of points per unit area which is the density of the point cloud. In an example, a point cloud having one point per square metre is characterised as "sparse point cloud", a point cloud having number of points in the range of one to two points per square metre is characterised as "low density point cloud", a point cloud having number of points in the range of two to five points per square metre is characterised as "medium density point cloud", a point cloud having number of points in the range of five to ten points per square metre is characterised as "dense point cloud", and a point cloud having number of points more than ten points per square metre is characterised as "high density point cloud". Moreover, the average of the at least one property of the plurality of points is determined for the plurality of points having at least one property in common. In an example, a location and a luminance is determined for each of the plurality of points. In such example, an average of the location and the average of luminance is determined for the point cloud.

In an embodiment, the method further comprises normalising the point cloud. The point cloud segmented into the at least one sub-volume corresponding to each of the at least one object may further be normalised. Notably, normalisation of the point cloud is done in order to regularise the number of plurality of points acquired. Such normalisation accelerates a processing speed of the data processing module as a smaller number of plurality of points are processed at a given instant of time. Moreover, the plurality of points associated with the objects that are not required may be discarded during normalisation of the point cloud. For example, the acquired point cloud may comprise plurality of points associated with a transmission line with an elevation of 12 metres above a ground level. In case of the autonomous driving vehicle being a car, such plurality of points associated with the transmission line may be discarded as the transmission line does not obstruct a path of the car. In another example, in case of the autonomous driving vehicle being a drone, the plurality of points associated with the transmission line are retained as the transmission line may possibly obstruct a path of the drone. It may be appreciated that in such example, the plurality of points associated with, for example, objects such as pebbles on the ground surface may be discarded.

In an embodiment, normalising the point cloud comprises performing at least one of a Poisson resampling, a random resampling, an adding and/or a voxelisation. In one implementation, the point cloud may be normalised by using the Poisson resampling, such that the plurality of points in the point cloud are analysed to determine if the plurality of points form a part of the at least one object. The points that qualifies as the part of the at least one object are retained, whereas other points that do not qualify as the part of the at least one object are discarded. That is, only the plurality of points associated with the at least one object are retained. In another implementation, the point cloud may also be normalised by using the random resampling such that the plurality of points associated with the at least one object are identified and retained. Another method of normalising the point cloud comprises using addition of the plurality of points for normalisation. Voxelisation is yet another method for normalising the point cloud. Voxelisation involves partitioning the point cloud into at least one voxel. The term "voxel" generally refers to a pixel in three-dimensions having a volume. Notably, the plurality of points in the point cloud have undefined dimensions as the plurality of points in the point cloud are represented as floating-point coordinates. The point cloud when partitioned into the voxels, converts the floating-point coordinates in the point cloud into integer coordinates having defined dimensions. In other words, the voxels may be defined as an element of a space having predefined, quantised dimensions. The point cloud is normalised into at least one voxel such that each voxel of the at least one voxel comprises an object of the at least object. Notably, the object of the at least one object having large dimensions (such as the roads) may form a part of more than one voxel. It will be appreciated that dimension of the voxels may vary depending upon dimensions of the at least one object. In an example, a dimension of the voxel may be 1×1×1 cubic metres. The voxels having such dimensions consumes less memory as compared to the voxels having smaller dimensions (such as 0.1×0.1×0.1 cubic metres), as the point cloud is normalised into less number of voxels. Such technique thereby reduces the number of voxels to be stored in the memory module and processed. In an example, a point cloud having a volume 4×4×4 cubic metres may be divided into four number of voxels such that each of the four voxels have a volume of 1×1×1 cubic metres. Therefore, the four number of voxels are required to be stored in the memory module. Moreover, if the same point cloud is divided into voxels having a volume of 0.5×0.5×0.5 cubic metres, the number of voxels required to divide the point cloud into voxels is 32. Therefore, the 32 voxels are required to be stored in the memory module for processing, thereby utilising large memory space while processing. Notably, the at least one object is normalised in the at least one voxel such that the at least one voxel corresponds to the sub-volume (as described in the preceding paragraphs).

Furthermore, the method comprises applying a non-uniform transform on each of the plurality of points corresponding to each of the at least one sub-volume, to obtain a transform coefficient for each of the plurality of points. It will be appreciated that the present method may employ machine learning algorithms for the extraction of uniform features of the at least one object. Throughout the present disclosure, the term "machine learning algorithm" refers to software-based machine learning algorithms that are executable upon computing hardware and are operable to adapt and adjust their operating parameters in an adaptive manner depending upon information that is presented to the software-based algorithms when executed upon the computing hardware. Optionally, the machine learning algorithms include neural networks such as recurrent neural networks, recursive neural networks, feed-forward neural networks, convolutional neural networks, deep belief networks, and convolutional deep belief networks; self-organising maps; deep Boltzmann machines; and stacked de-noising auto-encoders. Optionally, the machine learning algorithms employ any one or combination of the following computational techniques: constraint program, fuzzy logic, classification, symbolic manipulation, fuzzy set theory, evolutionary computation, cybernetics, data mining, approximate reasoning, derivative-free optimisation, decision trees, or soft computing.

An input to a machine learning based engine employing the machine learning algorithms is required to have regular and structured representation. The non-uniform transform is applied to each of the plurality of points in the at least one voxel in order to obtain regular and structured plurality of points. The non-uniform transform yields sampled transform coefficients (in a frequency domain) per cluster. In an example, the non-uniform transform applied on each of the plurality of points may be non-uniform Fourier transform, three-dimensional (3D) Hough transform, non-uniform cosine transform, non-uniform sin transform and the like.

In an embodiment, the method further comprises normalising the transform coefficients of each of the plurality of points, by employing the at least one parameter of the point cloud. It will be appreciated that each voxel comprises different number of plurality of points corresponding to the at least one object. As a result, the number of transform coefficients obtained after applying the non-uniform transform are different for each voxel. Therefore, the transform coefficients are normalised against an actual number of plurality of points in the voxel such that same number of transform coefficients are obtained for each voxel, irrespective of the number of plurality of points in the voxel. Such normalisation of the transform coefficients is performed using the at least one parameter of the point cloud such as the size, the volume, the centroid, the density and so forth.

Optionally, for the point cloud comprising two-dimensional (2D) plurality of points, the normalisation may be performed by discarding a DC component (such as a first transform coefficient) of the obtained transform coefficients. Such a normalisation provides a representation of plurality of points that is invariant to the location of the at least one object.

More optionally, for the point cloud comprising plurality of points not having a third coordinate (such as the third coordinate of the three-dimensional coordinate system), a value of the obtained non-uniform transform coefficient may be assumed to be 1. Such an assumption enhances computational efficiency of the data processing module as a time required for obtaining the transform coefficients by applying the non-uniform transform is reduced.

Moreover, the method comprises selecting a subset of the plurality of transform coefficients for extracting the uniform features of the at least one object within the environment. The normalisation of the transform coefficients of each of the plurality of points generates fixed number of sampled transform coefficients (in a frequency domain) per cluster. The subset of the plurality of transform coefficients are selected from the obtained transform coefficients and fed to the machine learning based engines as inputs. It will be appreciated that same number of transform coefficients are selected from each voxel.

In an embodiment, selecting the subset comprises one of selecting a predetermined number of the plurality of transform coefficients, or discarding at least one of the plurality of transform coefficients. The subset of the plurality of transform coefficients may be selected by selecting the predetermined number of the plurality of transform coefficients from the obtained transform coefficients by employing various techniques. For example, first 'N' ('N' being a total number of transform coefficients selected from the subset) coefficients may be selected from the subset of the plurality of transform coefficients to be fed as the inputs to the machine learning based engine. For example, ten number of transform coefficients may be obtained in each subset of the plurality of transform coefficients of each voxel. Out of the ten transform coefficients, first six (first 'N') transform coefficients may be selected to be fed as the inputs to the machine learning based engine. Optionally, a first transform coefficient may be discarded from the subset as the first transform coefficient may have a low frequency associated with it. In an example, ten number of transform coefficients may be obtained in each subset of the plurality of transform coefficients of each voxel. Out of the ten transform coefficients, the first transform coefficient is discarded and second transform coefficient to sixth transform coefficient are selected to be fed as the inputs to the machine learning based engine. The subset of the plurality of transform coefficients may also be selected by discarding the at least one of the plurality of transform coefficients. For example, ten number of transform coefficients are obtained in each subset of the plurality of transform coefficients of each voxel. Out of the ten transform coefficients, four transform coefficients are discarded to obtain six transform coefficients to be fed to the machine learning based engine. The machine learning based engine employing the machine learning algorithm analyse and processes the transform coefficients fed as the input to extract the uniform features of the at least one object from the point cloud of the environment. Further, the memory module stores the point cloud of the environment and the extracted uniform features of the at least one object.

In an example, the extracted uniform features of the at least one object may include, but not limited to, a size of the at least one object, a distance of the at least one object from the autonomous driving vehicle, a speed of the at least one object and so forth. Such extracted uniform features of the at least one object enables the autonomous driving vehicle to identify traffic congestion on the road, potholes that may obstruct the autonomous driving vehicle, a person crossing the road, turns that the autonomous driving vehicle requires to follow and so forth. Therefore, detection of the at least one object and extraction of the uniform features of the at least one object enables the autonomous driving vehicle to safely park in a parking area, apply emergency brakes when required, activate a collision warning, and the like.

According to an embodiment, the point-cloud acquisition device implemented on the autonomous driving vehicle, acquires point cloud comprising plurality of points in three-dimensional coordinates. For example, the point-cloud acquisition device can be implemented as at least one LIDAR on the autonomous driving vehicle for capturing point cloud data associated with objects encountered by the autonomous driving vehicle in a driving path thereof. Furthermore, the plurality of points is input to machine learning algorithms implementing neural networks, for the extraction of uniform features of the at least one object in the environment of the autonomous driving vehicle. In the above example, the plurality of points is input to a machine learning algorithm to identify objects encountered by the autonomous driving vehicle in the driving path thereof. Such a machine learning algorithm can be implemented on a data processing arrangement that is carried by the autonomous driving vehicle (such as, a processor of a carputer). Alternatively, the data processing arrangement can be implemented on a remote server arrangement that is communicatively coupled with the LIDAR and is configured to receive the point cloud data therefrom. Subsequently, the server arrangement is configured to identify the objects in the driving path of the autonomous driving vehicle and information corresponding to the identified objects is transmitted to the autonomous driving vehicle. It will be appreciated that, different objects having varied physical characteristics can be encountered in the driving path of the autonomous driving vehicle such as, other vehicles, barricades, trees, pedestrians, animals, fire hydrants and so forth. Consequently, the point cloud data corresponding to the objects will comprise unstructured irregular plurality of points having random spatial location, mean values and so forth. However, training of machine learning algorithms implementing the neural networks requires regular and structured representation of a point cloud data and a trained neural network requires regular and structured representation of point cloud data for analysing information from the cloud data. Therefore according to an optional embodiment extracted uniform features are used to train a neural network for analysing information of the cloud data (LIDAR data). The trained neural network can thereafter used for real-time or near real time analysis of information in the cloud data. In such a optional embodiment the non-uniform transform is applied on the plurality of points (from LIDAR) to transform the unstructured irregular plurality of points in the point cloud into rigidly defined regular structures that are fed to neural networks. The trained neural network can then be used to analyse information from measured point cloud data. This way objects can be identified in the environment from the point cloud data of the environment. In the above example, when the different objects are encountered in the driving path of the autonomous driving vehicle, the identification of the uniform features of objects allows the autonomous driving vehicle to quickly, reliably and efficiently make decisions with respect to navigation thereof around the objects, thereby, improving safety and reliability associated with autonomous driving vehicles employing machine learning algorithms (of the trained neural network) for identification of objects.

According to a optional embodiment the method comprises using the extracted uniform features as an input to a trained neural network. Additionally the neural network is trained using the extracted uniform features during a training phase. Furthermore the training of a neural network can be done in separately from the using of the trained network.

Furthermore embodiments enable to classify information in a point cloud. As an example use case is to know which objects are around a vehicle. A LIDAR is used to acquire a point cloud associated with volume around the vehicle. According to embodiments the acquired point cloud is segmented (sub-divided) in to a plurality of smaller clusters (clustering step). Each cluster is optionally normalized of as a next step. The segmented point clouds (clusters) are still after said still irregular and difficult to analyse. A non-uniform transformation is applied to each points in the segmented point cloud (cluster) to obtain transform coefficients. A sub set of the coefficient is selected for extracting uniform features. As an example 20 first coefficients can be selected as features of each segmented point cloud (cluster). This way we will obtain 20 coefficient for each segmented point cloud cluster. This is significantly less than in typical point cloud cluster which might comprise tens, hundreds or thousands of points.

According to an embodiment said 20 coefficients can be used as an input to a trained neural network. During the training of the neural network a cloud point cloud can be measured for example in a controlled environment with annotated objects such as: car, pedestrian, tree, truck, etc. In an example said 20 coefficients are used together with annotation data to train neural network.

During use of the trained neural network a same about of coefficients as used in training should be used. In addition same normalization as used during the training should be used. The method thus can reduce arbitrary size point cloud measurement to limited set of data such as 20 coefficients thus improving neural network training and usage.

The present disclosure also relates to the system as described above. Various embodiments and variants disclosed above apply mutatis mutandis to the system.

Optionally, the data processing module is further configured to determine at least one property for each of the plurality of points corresponding to the point cloud, wherein the at least one property comprises: a location, a luminance, a colour, a local density or a binary presence.

Optionally, the data processing module is further configured to determine at least one parameter for the point cloud using the at least one property of each of the plurality of points, wherein the at least one parameter comprises: a size, a volume, a centroid, a density, an average of the at least one property of each of the plurality of points.

Optionally, the data processing module is further configured to normalise the point cloud.

Optionally, the data processing module is further configured to normalise the point cloud by performing at least one of: Poisson resampling, random resampling, adding and/or voxelisation.

Optionally, the data processing module is further configured to normalise the transform coefficients of each of the plurality of points, by employing the at least one parameter of the point cloud.

Optionally a system comprises a trained neural network. The trained neural network can be part of for example a vehicle or a sensor system comprising a Lidar. In such optional system the extracted uniform features are used as an input to the trained neural network of the vehicle or the sensor system. Such trained neural network and said input provide fast and reliable object recognition.

Additionally training of the neural network is done using the extracted uniform features during a training phase.

DETAILED DESCRIPTION OF THE DRAWINGS

Figure 1:
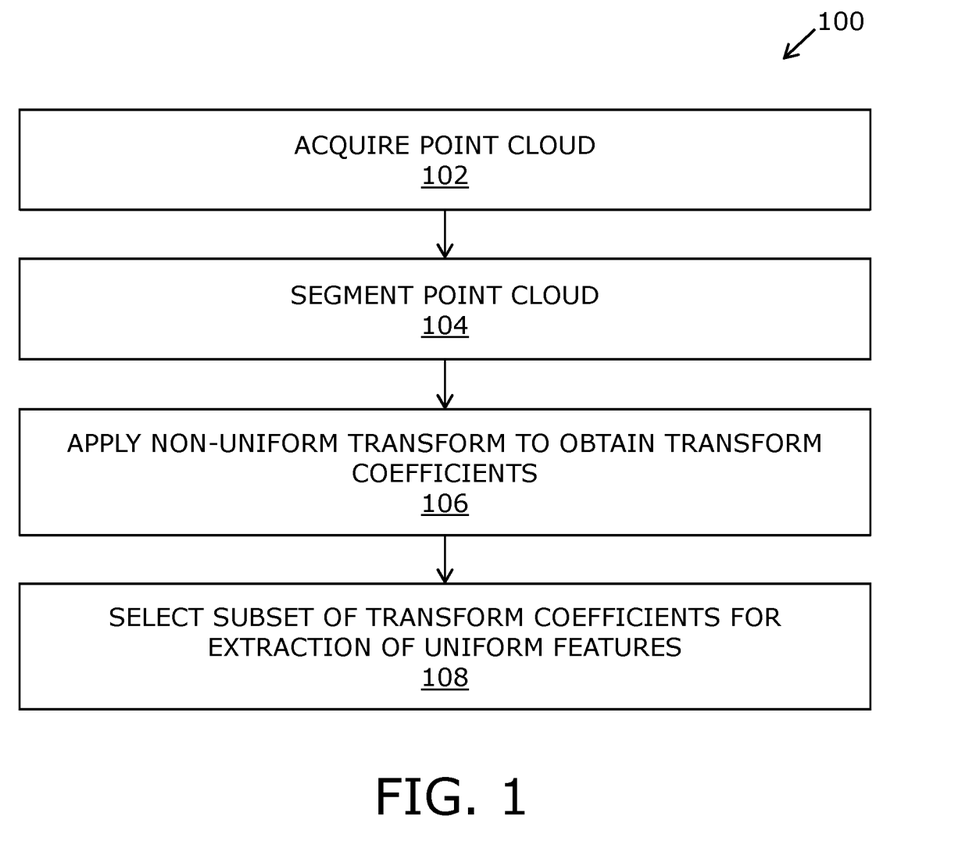
FIG. 1 is an illustration of steps of a method for extracting uniform features of at least one object, from a point cloud of an environment, in accordance with an embodiment of the present disclosure.

Referring to FIG. 1, there is shown an illustration of steps of a method 100 for extracting uniform features of at least one object, from a point cloud of an environment, in accordance with an embodiment of the present disclosure. At a step 102, the point cloud associated with the environment having the at least one object is acquired, wherein the point cloud is associated with a volume comprising a plurality of points. At a step 104, the point cloud is segmented into at least one sub-volume corresponding to each of the at least one object. At a step 106, a non-uniform transform is applied on each of the plurality of points corresponding to each of the at least one sub-volume, to obtain a transform coefficient for each of the plurality of points. At a step 108, a subset of the plurality of transform coefficients is selected for extracting the uniform features of the at least one object within the environment.

The steps 102 to 108 are only illustrative and other alternatives can also be provided where one or more steps are added, one or more steps are removed, or one or more steps are provided in a different sequence without departing from the scope of the claims herein.

Figure 2:
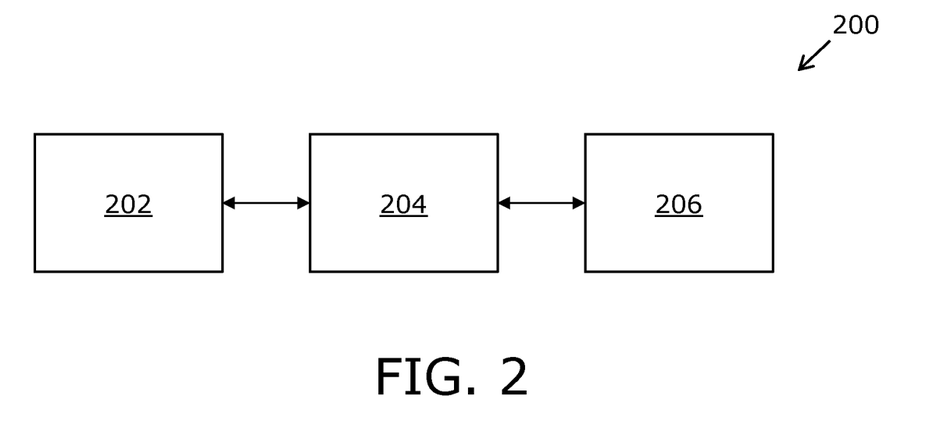
FIG. 2 is a block diagram of a system for extracting uniform features of at least one object, from a point cloud of an environment, in accordance with an embodiment of the present disclosure.

Referring to FIG. 2, there is shown a block diagram of a system 200 for extracting uniform features of at least one object, from a point cloud of an environment, in accordance with an embodiment of the present disclosure. The system 200 comprises a point-cloud acquisition device 202 to acquire the point cloud associated with the environment having the at least one object. The system 200 further comprises a data processing module 204 communicatively coupled to the point-cloud acquisition device 202 to perform processing of the point cloud.

Moreover, the system 200 comprises a memory module 206 communicatively coupled to the data processing module 204 to store the point cloud of the environment and the uniform features of the at least one object.

Figure 3:
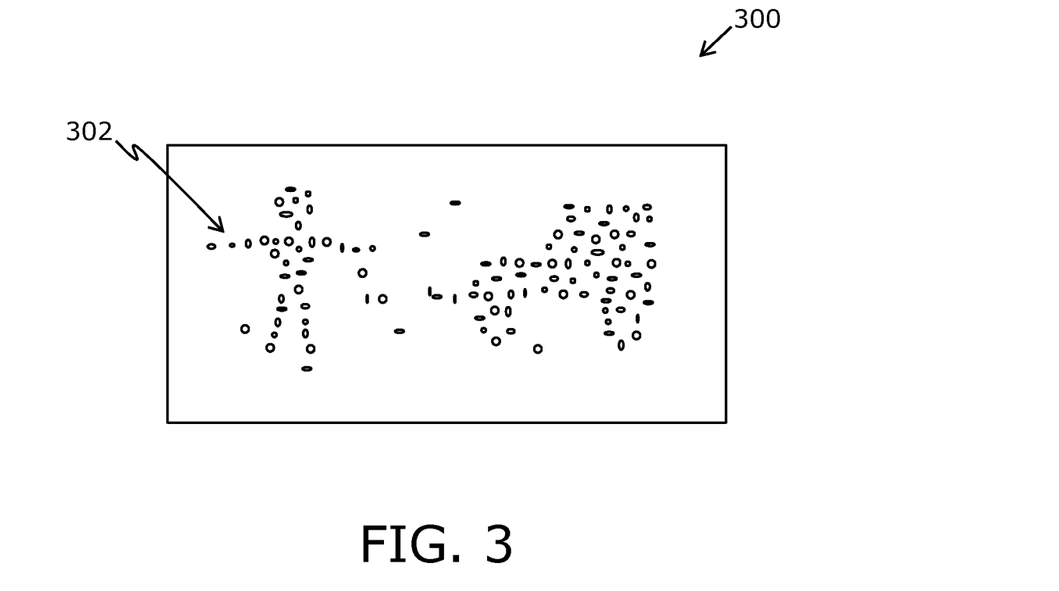
FIG. 3 is a schematic illustration of a point cloud associated with an environment, in accordance with an exemplary embodiment of the present disclosure.

Referring to FIG. 3, there is shown a schematic illustration of a point cloud 300 associated with an environment, in accordance with an exemplary embodiment of the present disclosure. As shown, the point cloud comprises a plurality of points 302 associated with various objects in the environment such as a person, a vehicle and the like. The plurality of points 302 of the point cloud 300 are acquired by the point-cloud acquisition device (such as the point-cloud acquisition device 202).

Figure 4:
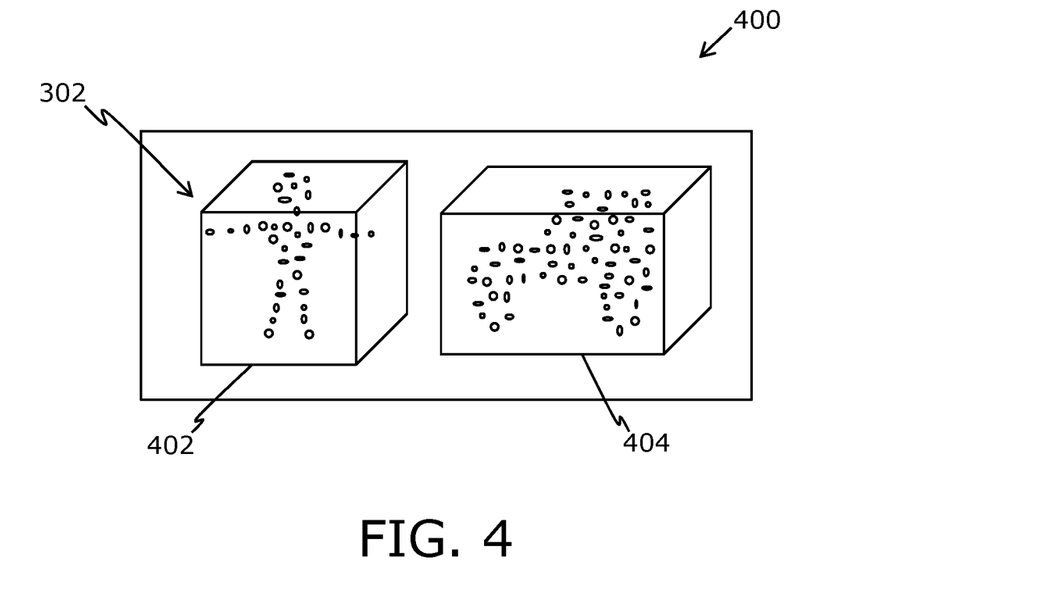
FIG. 4 is a schematic illustration of a point cloud segmented into sub-volumes, in accordance with an exemplary embodiment of the present disclosure.

Referring to FIG. 4, there is shown a schematic illustration of a point cloud 400 segmented into sub-volumes, in accordance with an exemplary embodiment of the present disclosure. A set of points of the plurality of points 302 associated with the person is segmented into a cluster having a sub-volume 402. Moreover, a set of points of the plurality of points 302 associated with the vehicle is segmented into a cluster having a sub-volume 404. Such segmentation of the point cloud 400 is performed to derive transform coefficients by applying a non-uniform transform on each cluster of the point cloud 400.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for extracting uniform features of an at least one object from a point cloud of an environment, the method comprising:
   acquiring the point cloud associated with the environment having the at least one object, wherein the point cloud is associated with a volume comprising a plurality of points;
   segmenting the point cloud into at least one sub-volume corresponding to each of the at least one object;
   applying a non-uniform Fourier transform on each of the plurality of points corresponding to each of the at least one sub-volume to obtain a transform coefficient for each of the plurality of points; and
   selecting a subset of the plurality of transform coefficients for extracting the uniform features of the at least one object within the environment.

2. A method according to claim 1, wherein the segmenting comprises employing one of: K-Means technique, Kernel K-Means technique, or Hierarchical Clustering technique.

3. The method according to claim 1, further comprising determining at least one property for each of the plurality of points corresponding to the point cloud, wherein the at least one property comprises: a location, a luminance, a colour, a local density or a binary presence.

4. The method according to claim 3, further comprising determining at least one parameter for the point cloud using the at least one property of each of the plurality of points, wherein the at least one parameter comprises: a size, a volume, a centroid, a density, an average of the at least one property of each of the plurality of points.

5. The method according to claim 1, further comprising normalising the point cloud.

6. The method according to claim 5, wherein normalising the point cloud comprises performing at least one of: Poisson resampling, random resampling, adding and/or voxelisation.

7. The method according to claim 4, further comprising normalising the transform coefficients of each of the plurality of points by employing the at least one parameter of the point cloud.

8. The method according to claim 1, wherein selecting the subset comprises one of:
   selecting a predetermined number of the plurality of transform coefficients, and
   discarding at least one of the plurality of transform coefficients.

9. The method according to claim 1, wherein the method further comprises using the extracted uniform features as an input to a trained neural network.

10. The method according to the claim 9, wherein the neural network is trained using the extracted uniform features during a training phase.

11. A system for extracting uniform features of an at least one object, from a point cloud of an environment, the system comprising:
    a point-cloud acquisition device to acquire the point cloud associated with the environment having the at least one object, wherein the point cloud is associated with a volume comprising a plurality of points;
    a data processing module communicatively coupled to the point-cloud acquisition device, wherein the data processing module is configured to:
    receive the point cloud from the point-cloud acquisition device,
    segment the point cloud into at least one sub-volume corresponding to each of the at least one object,
    apply a non-uniform Fourier transform on each of the plurality of points corresponding to each of the at least one sub-volume to obtain a transform coefficient for each of the plurality of points, and
    select a subset of the plurality of transform coefficients for extracting the uniform features of the at least one object within the environment; and
    a memory module communicatively coupled to the data processing module, wherein the memory module is configured to store the point cloud of the environment and the uniform features of the at least one object.

12. The system according to claim 11, wherein the data processing module is further configured to determine at least one property for each of the plurality of points corresponding to the point cloud, wherein the at least one property comprises: a location, a luminance, a colour, a local density or a binary presence.

13. The system according to claim 12, wherein the data processing module is further configured to determine at least one parameter for the point cloud using the at least one property of each of the plurality of points, wherein the at least one parameter comprises: a size, a volume, a centroid, a density, an average of the at least one property of each of the plurality of points.

14. The system according to claim 13, wherein the data processing module is further configured to normalise the point cloud.

15. The system according to claim 14, wherein the data processing module is configured to normalise the point cloud by performing at least one of: Poisson resampling, random resampling, adding, and/or voxelisation.

16. The system according to claim 13, wherein the data processing module is further configured to normalise the transform coefficients of each of the plurality of points by employing the at least one parameter of the point cloud.

17. The system according to claim 11, wherein the point-cloud acquisition device is implemented in an autonomous driving vehicle.

18. The system according to claim 11, wherein the system further comprises a trained neural network, the trained neural network configured to use the extracted uniform features as an input.

19. The system according to the claim 18, wherein the neural network is trained using the extracted uniform features during a training phase.

* * * * *